(12) United States Patent
Xiao et al.

(10) Patent No.: US 12,252,449 B2
(45) Date of Patent: Mar. 18, 2025

(54) DRY GRANULAR CERAMIC TILE FROM WET SLURRY SPRAYING PROCESS AND PREPARATION METHOD THEREOF

(71) Applicant: MONALISA GROUP CO., LTD, Foshan (CN)

(72) Inventors: Libiao Xiao, Foshan (CN); Qinggang Wang, Foshan (CN); Zengcheng Qin, Foshan (CN); Yuandong Yang, Foshan (CN); Xianchao Wang, Foshan (CN); Zhicong Yan, Foshan (CN); Kemu Cheng, Foshan (CN)

(73) Assignee: MONALISA GROUP CO., LTD, Foshan (CN)

( * ) Notice: Subject to any disclaimer, the term of this patent is extended or adjusted under 35 U.S.C. 154(b) by 793 days.

(21) Appl. No.: 17/595,428

(22) PCT Filed: Nov. 21, 2019

(86) PCT No.: PCT/CN2019/120000
§ 371 (c)(1),
(2) Date: Nov. 16, 2021

(87) PCT Pub. No.: WO2020/233032
PCT Pub. Date: Nov. 26, 2020

(65) Prior Publication Data
US 2022/0204416 A1 Jun. 30, 2022

(30) Foreign Application Priority Data
May 17, 2019 (CN) .......................... 201910412550.7

(51) Int. Cl.
*C04B 41/86* (2006.01)
*C03C 8/04* (2006.01)
*C03C 8/16* (2006.01)
*C03C 8/22* (2006.01)
*B28B 11/04* (2006.01)
*B28B 11/08* (2006.01)
*B41M 5/00* (2006.01)

(52) U.S. Cl.
CPC ................ *C04B 41/86* (2013.01); *C03C 8/04* (2013.01); *C03C 8/16* (2013.01); *C03C 8/22* (2013.01); *B28B 11/044* (2013.01); *B28B 11/048* (2013.01); *B28B 11/08* (2013.01); *B41M 5/007* (2013.01); *C04B 2235/9661* (2013.01)

(58) Field of Classification Search
CPC .. C04B 41/86; C03C 8/02; C03C 8/16; C03C 8/22
See application file for complete search history.

(56) References Cited

FOREIGN PATENT DOCUMENTS

| CN | 102040398 A | 5/2011 |
|---|---|---|
| CN | 107935386 A | 4/2018 |
| CN | 109516691 A | 3/2019 |
| EP | 0303402 A2 * | 2/1989 |

* cited by examiner

*Primary Examiner* — Nathan H Empie
(74) *Attorney, Agent, or Firm* — Alleman Hall & Tuttle LLP

(57) ABSTRACT

A dry granular ceramic tile from a wet slurry spraying process and a preparation method thereof, comprises: applying an overglaze on a green body, applying a pattern by ink-jet printing, applying a dry granular glaze by bell-shaped spraying, and sintering to obtain ceramic tiles. The dry granular glaze contains: by mass percentage, dry granular frit A: 15%, dry granular frit B: 12% to 15%, dry granular frit C: 13% to 17%. The softening temperature of the dry granular frit A is 1135° C. to 1175° C., 980° C. to 1050° C. for the dry granular frit B, and 1020° C. to 1127° C. for the dry granular frit C. The dry granular frits used in the present invention adopts a combination of dry granular frits with three different melting points, and using such a matching method, it is convenient for the effective adjustment of the brick shape and the firing temperature during production.

8 Claims, No Drawings

DRY GRANULAR CERAMIC TILE FROM WET SLURRY SPRAYING PROCESS AND PREPARATION METHOD THEREOF

TECHNICAL FIELD

The present invention relates to the technical field of production of ceramic tiles, in particular to a dry granular ceramic tile from a wet slurry spraying process and a preparation method thereof.

BACKGROUND

With the rapid development of society, people's consumption level has gradually increased. While pursuing a high quality of life, they have paid more and more attention to the aesthetics of their living environment. After the long development of the ceramics industry, traditional polished and polished glazed tiles cannot satisfy people's requirements for aesthetics any longer. Traditional polished glazes and polished tiles have the disadvantages of an uneven mirror surface and a blurry pattern texture. Therefore, it is difficult to achieve a clear glaze effect in the production of tiles with complicated layout texture details and a dark layout design. In order to meet the needs of the market, the development of glazed tiles with high flatness and clear transparency will become the trend of the industry.

For the current market, a dry spreading process is generally adopted. There are some disadvantages such as complex technology and high production cost. Moreover, it is easy to produce many pores on the brick surface when producing dark plates, and the production technology is also unstable.

For example, Chinese patent application CN 109516691 A discloses a full polished glossy ceramic with dark patterns and a preparation method thereof. The process also involves spraying dry granular glaze. However, its publication does not disclose the specific process flow, parameters, and particle gradation relationship of the solid frit, but only mentions a general description of the effect of ceramic products prepared by spraying dry granular glaze.

SUMMARY

Technical Problem

In view of the above-mentioned problems, the present invention aims to provide a glazed tile with a highly flat mirror surface and clear transparency and a preparation method by using a reasonable proportion of dry granular frit with different melting points.

Technical Solution

In the first aspect, the invention provides a method for preparing dry granular ceramic tile by a wet slurry spraying process, comprising:
applying surface glaze and ink-jet printing pattern on a green body, then bell-shaped spraying dry granular glaze, and sintering to obtain ceramic tiles;
wherein the dry granular glaze contains: by mass percentage, dry granular frit A: 15%, dry granular frit B: 12% to 15%, dry granular frit C: 13% to 17%, printing powder: 5% to 7%, glue: 35% to 38%, and water 10% to 13%; wherein the printing powder is composed of 45% to 50% feldspar powder, 15% to 17% limestone powder, and 35% to 40% quartz powder; and wherein the particle gradation of the dry granular frits in the dry granular glaze is as follows: 60 to 80 mesh: 8% to 12%, 80 to 100 mesh: 6% to 10%, 100 to 120 mesh: 8% to 15%, 120 to 140 mesh: 8% to 15%, 140 to 250 mesh: 50% to 60%, 250 to 325 mesh: 1% to 4%, and below 325 mesh: ≤2%;
the softening temperature of the dry granular frit A is 1135° C. to 1175° C., the softening temperature of the dry granular frit B is 980° C. to 1050° C., and the softening temperature of the dry granular frit C is 1020° C. to 1127° C.

According to the present invention, the full polished tiles are produced by wet slurry spraying and a dry particle process. The ceramic tiles produced by this process can obtain a glaze surface with a highly flat mirror surface and clear transparency after being polished, and the texture pattern can be clearly seen for the design with complex layout texture details. The production process is simple, solves the problem of multiple pores in the dark color layout to a certain extent, and is favorable for developing the dark color layout. Moreover, the dry granular frits used in the present invention adopt the matching of three dry granular frits with different melting points, and the adoption of the matching method is convenient for effectively adjusting the brick shape and the firing temperature during production.

Preferably, the expansion coefficient of the dry granular frit A is $7.3 \times 10^{-6}$ to $7.4 \times 10^{-6}/°$ C. at the temperature of 40° C. to 600° C., the expansion coefficient of the dry granular frit B is $6.6 \times 10^{-6}$ to $6.7 \times 10^{-6}/°$ C. at the temperature of 40° C. to 600° C., and the expansion coefficient of the dry granular frit C is $6.9 \times 10^{-6}$ to $7.0 \times 10^{-6}/°$ C. at the temperature of 40° C. to 600° C.

Preferably, the dry grain glaze contains: printing powder: 5% to 7%, glue: 35% to 38%, and water: 10% to 13%.

Preferably, the dry granular glaze comprises the following chemical components: loss on ignition by mass percentage: 0.50% to 2.00%, $SiO_2$: 60.50% to 65.00%, $Al_2O_3$: 12.00% to 14.00%, $Fe_2O_3$: 0.05% to 0.20%, $TiO_2$: 0.05% to 0.10%, CaO: 9.00% to 11.00%, MgO: 1.00% to 2.00%, $K_2O$: 4.00% to 8.00%, $Na_2O$: 0.00% to 0.05%, ZnO: 1.87% to 2.32%, and $ZrO_2$: 0.01% to 0.03%. The chemical composition refers to the chemical composition of all solid dry particles, and the printing powder, the glue, and the water in the dry granular glaze are not included.

Preferably, the specific gravity of the dry grain glaze is 1.52 to 1.54, the flow rate is 32 to 35 seconds, and the glaze application amount is 900 to 1200 g/m².

Preferably, the particle gradation of the dry granular frits is as follows: 60 to 80 mesh: 8% to 12%, 80 to 100 mesh: 6% to 10%, 100 to 120 mesh: 8% to 15%, 120 to 140 mesh: 8% to 15%, 140 to 250 mesh: 50% to 60%, 250 to 325 mesh: 1% to 4%, and below 325 mesh: ≤2%;

Preferably, the temperature of the green body before applying the surface glaze is 65° C. to 70° C.

Preferably, the specific gravity of the surface glaze is 1.46 to 1.47, and the glazing amount is 500 to 550 g/m².

Preferably, the temperature of the green body before spraying and drying the glaze particles is 60° C. to 70° C.

Preferably, the firing period is 95 to 110 minutes, and the highest firing temperature range is 1175° C. to 1223° C.

In the second aspect, the present invention provides ceramic tiles prepared by any of the above preparation methods.

Beneficial Effect

The ceramic tiles have a glaze surface with a highly flat mirror surface and clear transparency, and can realize the effect of clear glaze on the layout design with complex texture details and a dark layout.

DETAILED DESCRIPTION

The present invention will be further described below through the following embodiments. It should be understood that the following embodiments are only used to illustrate the present invention, but not to limit the present invention. The following percentages refer to mass percentages unless otherwise specified.

First, a green body is prepared. The green body can be prepared from a well-known ceramic raw material according to a conventional method, for example, the green body is ball-milled, powder-sprayed and granulated, pressed by dry pressing molding, and dried in a drying kiln to obtain a dried green body. The drying time can be 1 to 1.2 hours, and the moisture content of the dried blank can be controlled within 0.5%.

Then, a surface glaze is applied on the green body. The temperature of the green body before applying the surface glaze is preferably controlled to be 65° C.~70° C. Within this temperature range, it can be effectively ensured to be dry after the green body is taken out of the glaze spraying cabinet, so that the probability of firing defects caused by undried dust falling onto the glaze surface is reduced, and the quality of products is improved. The overglaze formulation is not particularly limited, and the overglaze formulations commonly used in the art may be used. In one embodiment, the surface glaze has a chemical composition of: ignition loss by mass percentage: 3.00% to 5.00%, $SiO_2$: 57.00% to 60.00%, $Al_2O_3$: 23.00% to 25.00%, $Fe_2O_3$: 0.30% to 0.40%, $TiO_2$: 0.10% to 0.20%, CaO: 0.30% to 0.40%, MgO: 0.10% to 0.30%, $K_2O$: 4.00% to 6.00%, $Na_2O$: 2.00% to 3.00%, and $ZrO_2$: 6.00% to 12.00%. The surface glaze with this chemical composition has a high whiteness, a wide firing temperature range, and good color development of various ceramic inks.

The application method of the surface glaze includes but is not limited to glaze spraying, glaze pouring and so on. The specific gravity of the sprayed surface glaze can be 1.46~1.47, and the glazing amount can be 500 to 550 g/m².

Then, a pattern is printed on the surface glaze. The pattern printing method is not particularly limited, and a method of printing the pattern commonly used in the art can be used, and among them, ink-jet printing is preferable, so that a clearer pattern can be obtained.

Next, dry granular glaze is sprayed onto the tile. The temperature of the bricks before the dry granular glaze is preferably controlled to be 60° C.~70° C. Because the ink amount of the dark color layout is large, it is difficult to discharge moisture from the sprayed glaze slurry. The temperature of the bricks before the dry granular glaze is controlled in this range, so that the bricks are able to discharge moisture in time to meet the conditions for entering into a kiln for firing and reduce the probability of brick frying caused by the fact that the moisture cannot be discharged in time.

The wet method is adopted to spray the slurry dry particles, the glaze surface with a highly uniform mirror surface and clear transparency can be obtained after polishing, and the texture pattern can be clearly seen for the design of complex texture details of the layout (design patterns in the production). The problem of multiple pores being easily generated on the surface of a brick when the dark layout is produced is solved to a certain extent, which is beneficial to the development of the dark layout technology. Due to the inconsistent gray scale of the layout in the dark color layout, even if glue is sprayed and fixed in a subsequent process in the dry-method dry particle distributing and spreading process, this method easily disperses the dry granular frit, so that the dry particle surface is uneven, and the glaze surface easily appears uneven after sintering. In the wet slurry spraying process, printing powder, glue, and water are added to mix, which can effectively prevent the unevenness of dry granules, and the printing powder has the functions of fluxing and improving high-temperature fluidity, and can properly adjust the phenomenon in which the dry granules are not thoroughly molten due to different gray levels of the dark color layout, thereby solving the problem of more pores on the dark color layout during the dry particle distribution process on this basis.

Dry granular glaze contains three kinds of solid dry granular frits: dry granular frit A, dry granular frit B, and dry granular frit C. These three kinds of dry granular frits have different melting points and different expansion coefficients. The softening temperature of the dry granular frit A is 1135° C. to 1175° C. The softening temperature of the dry granular frit B is 980° C. to 1050° C. The softening temperature of the dry granular frit C is 1020° C. to 1127° C. In actual ceramic production, the change of the firing temperature of the kiln during the ceramic production has a greater impact on the brick shape of the product, and the adjustment of the base material of the ceramic blank is time consuming and energy consuming. In order to reduce the impact on the product, the proportion of high and low temperature dry granular frit can be appropriately adjusted according to the actual production situation through the combination of the three kinds of dry granular frit with such melting points, and the overall melting temperature of the glaze surface of the dry granular frit can be changed to improve the brick shape. Such an adjustment method is beneficial to save the cost and time for adjusting the ceramic base material in actual production, and the stability of the ceramic base material can also effectively ensure the stability of various properties of the product after being fired to a certain extent.

The expansion coefficient of the dry granular frit A at 40° C. to 600° C. may be $7.3 \times 10^{-6}$ to $7.4 \times 10^{-6}$/° C., for example, $7.3379 \times 10^{-6}$/° C.

The expansion coefficient of the dry granular frit B at 40° C. to 600° C. may be $6.6 \times 10^{-6}$ to $6.7 \times 10^{-6}$/° C., for example, $6.6630 \times 10^{-6}$/° C.

The expansion coefficient of dry granular frit C at 40° C. to 600° C. is $6.9 \times 10^{-6}$ to $7.0 \times 10^{-6}$/° C., for example, $6.9141 \times 10^{-6}$/° C.

Based on the production conditions, the expansion coefficient of the green body in actual production is higher than that of the glaze, and the expansion coefficient of the green body is difficult to reduce. The combination of the three kinds of dry granular frit with such expansion coefficients can provide a more convenient adjustment method for the adjustment of the expansion coefficient of the glaze during production, so that the adjustment space of the expansion coefficient of the glaze is wider.

In some embodiments, the chemical composition of dry granular frit A is: $SiO_2$: 63.35% to 64.21%, $Al_2O_3$: 13.43% to 13.98%, CaO: 10.01% to 11.32%, MgO: 1.20% to 1.33%, $K_2O$: 4.87% to 5.44%, $Na_2O$: 0.0% to 0.3%, ZnO: 5.34% to 6.74%, and $ZrO_2$: 0.20% to 0.37%.

In some embodiments, the chemical composition of dry granular frit B is: $SiO_2$: 58.73% to 59.81%, $Al_2O_3$: 10.90% to 13.30%, CaO: 11.62% to 13.93%, MgO: 0.52% to 1.12%, $K_2O$: 5.25% to 6.23%, $Na_2O$: 1.50% to 1.96%, ZnO: 4.34% to 6.49%, and $ZrO_2$: 0.12% to 0.29%.

In some embodiments, the chemical composition of dry granular frit C is: $SiO_2$: 60.10% to 62.35%, $Al_2O_3$: 11.10% to 11.70%, CaO: 10.00% to 11.52%, MgO: 1.20% to 1.75%, $K_2O$: 5.10% to 5.65%, $Na_2O$: 1.92% to 2.16%, ZnO: 6.21% to 6.84%, and $ZrO_2$: 0.25% to 0.30%.

The content of the dry granular frit A in the dry granular glaze can be 15%. The content of the dry granular frit B may be 12% to 15%, for example 14%. The content of the dry granular frit C may be 13% to 17%, for example 15%.

In the dry granular glaze, the total content of dry granular frit A, dry granular frit B, and dry granular frit C can be 40% to 44%.

The particle gradation of the dry granular frits in the dry granular glaze may be: 60 to 80 mesh: 8% to 12%, 80 to 100 mesh: 6% to 10%, 100 to 120 mesh: 8% to 15%, 120 to 140 mesh: 8% to 15%, 140 to 250 mesh: 50% to 60%, 250 to 325 mesh: 1% to 4%, and below 325 mesh: ≤2%. By adopting such a particle gradation, the dry granular glaze is suitable for glazing with a bell jar. Compared with the linear glaze spraying shower, the uniformity of the dry granular glaze amount of the whole brick surface can be more effectively controlled, so that the product can obtain a higher flatness during the firing process.

The dry granular glaze can also contain printing powder: 5% to 7%, glue: 35% to 38%, water: 10% to 13%.

The glue mainly plays a role in uniformly dispersing dry granular frits and adjusting the suspension property of the slurry. The surface tension of the glue used is similar to (preferably equal to) the ink tension. For example, when the ink surface tension is 28 $mN·m^{-1}$ to 34 $mN·m^{-1}$, the surface tension of the glue is also 28 $mN·m^{-1}$ to 34 $mN·m^{-1}$. The glue can be made by mixing a glaze glue commonly used in this field with carboxymethyl cellulose with high viscosity (for example, greater than or equal to 800 to 1200 mPa·s in 2% aqueous solution viscosity), and the ratio of the mixing is 100:0.7 to 0.9 (For example, 100:0.8).

In this embodiment, the dry granular glaze contains a larger amount of glue and a smaller amount of water, so that the flowing and suspending performance of the dry granular glaze slurry during production and use processes are effectively ensured, and the agglomeration and precipitation of the dry granular frit are reduced. The water content in this range ensures the dissolubility of the printing powder, the printing powder is dissolved more uniformly, and the phenomenon of supersaturation and coagulation will not occur. The glue content in this range can improve the bonding performance of the dry granular glaze and act as a fixing agent. The range of the glue surface tension is adjusted to be adaptive to the ink surface tension provided by the ink manufacturer (the ink surface tension data provided is 28 $mN·m^{-1}$~34 $mN·m^{-1}$), so that the design pattern printed by inkjet printing will not be repelled due to the large difference in surface tension of the design pattern and the ink surface tension, causing the dry granular glaze at the printed pattern to shrink outward, and the dry granular glaze is not adhered to the pattern surface, thereby causing the defect of the leakage of the dry granular glaze after firing.

The printing powder is prepared from feldspar powder, limestone powder, and quartz powder. The content of feldspar powder can be 45% to 50%, the content of limestone powder can be 15% to 17%, and the content of quartz powder can be 35% to 40%. The printing powder has the function of fluxing, and the firing temperature, the high temperature fluidity, and the flow rate of the dry granular glaze can be better adjusted in this system to ensure that the slurry has good fluidity.

In some embodiments, the chemical composition of the printing powder is shown in Table 1.

TABLE 1

Table 1 Chemical composition of printing powder (wt %)

| IL (loss on ignition) | $SiO_2$ | $Al_2O_3$ | $Fe_2O_3$ | $TiO_2$ | CaO | MgO | $K_2O$ | $Na_2O$ | $P_2O_5$ | $SO_3$ |
|---|---|---|---|---|---|---|---|---|---|---|
| 7.44 | 54.73 | 17.92 | 0.23 | 0.06 | 9.23 | 2.78 | 3.04 | 3.92 | 0.19 | 0.33 |

The chemical composition of the dry granular glaze frits can be: based on mass percentage, loss on ignition: 0.50% to 2.00%, $SiO_2$: 60.50% to 65.00%, $Al_2O_3$: 12.00% to 14.00%, $Fe_2O_3$: 0.05% to 0.20%, $TiO_2$: 0.05% to 0.10%, CaO: 9.00% to 11.00%, MgO: 1.00% to 2.00%, $K_2O$: 4.00% to 8.00%, $Na_2O$: 0.00% to 0.05%, ZnO: 1.87% to 2.32%, and $ZrO_2$: 0.01% to 0.03%. The chemical composition mentioned here does not include the chemical composition of printing powder, glue and water.

In a preferred embodiment, the specific gravity of the dry granular glaze is 1.52 to 1.54, and the flow rate is 32 to 35 seconds. The flow rate here means that the 8 mm caliber flow rate cup is filled with the object to be measured, the small hole below the flow rate cup is opened, and the time from the beginning to the end of the flow of the object to be measured is recorded as the flow rate of the object to be measured. By controlling the specific gravity and flow rate of the dry granular glaze within the above range, the phenomenon of precipitation of the dry granular glaze slurry can be effectively improved, so that the slurry has good suspension property and fluidity. The glazing application amount of dry granular glaze can be 900~1200 $g/m^2$.

Then, the obtained green bricks are dried. The drying temperature can be controlled between 140° C. to 150° C., and the moisture content after drying is controlled within 1.0%.

Next, the green bricks are fired. The sintering period can be 95 to 110 minutes. Because the proportion of the dry granular glaze frit can be adjusted, the maximum sintering temperature can be adjusted in a wide range, which can be 1135 to 1223° C.

Then it is polished (full polishing). In some embodiments, the polishing line parameters are shown in Table 2.

TABLE 2

| Table 2 Polishing line parameters | | | | | | | | | | |
|---|---|---|---|---|---|---|---|---|---|---|
| Mesh | 180 | 240 | 320 | 400 | 600 | 800 | 1000 | 1500 | 2000 | 3000 |
| Number of groups | 3 | 9 | 4 | 3 | 4 | 4 | 4 | 4 | 4 | 3 |
| Pressure (MPa) | 2~3 | 2~3 | 2~3 | 2~3 | 2~3 | 2~3 | 2~3 | 2~3 | 2~3 | 2~3 |

The number of meshes in Table 2 refers to the number of modules, the number of groups refers to the number of groups of modules, and the pressure refers to the pressure of the polishing head.

The polishing line parameters shown in Table 2 are adopted, so that the probability of yellow edge polishing and bottom leakage easily occurring on a gray layout can be improved.

After polishing, the polishing can also be carried out to edge grinding, grading, packaging, storage, and other post-treatments.

The ceramic tile obtained by the preparation method of the present invention has a glaze surface with a highly flat mirror surface and clear transparency. Compared with the dry granular glaze process involved in Chinese patent CN 109516691 A, under the condition of the same mirror surface, it can effectively ensure the dispersion uniformity of the dry granular solid frit in the dry granular glaze due to the characteristics of glue and printing powder, and achieve the effect of the isotropic uniformity of the amount of dry granular glaze on the brick surface during the dry granular glaze spraying process, ensure the high-viscosity cohesiveness after the glaze surface is dried, prevent the phenomenon of the dry granular solid frits being blown away, and guarantee the flatness of the dry granular glaze surface before entering the kiln. The dry granular glaze has better fluidity under high temperature melting, so higher flatness can be obtained after firing, the glaze effect of a highly flat mirror surface can be obtained without deep polishing in the later polishing process of the product, and the production cost can be saved under the same conditions. In the process of preparing the dry granular glaze, the present invention has lower water content than the Chinese patent CN 109516691 A, effectively ensures the flow and suspension performance of dry granular glaze slurry during production and use, reduces the phenomenon of precipitation of dry granular frit, reduces the drying cycle of the green bricks after slurry spraying, reduces energy consumption, and shortens the production cycle. Due to the particle gradation of the solid dry granular frit, the process adopts the bell jar spraying method in the production process, which can effectively control the uniformity of the dry granular glaze amount of the whole brick surface compared with the linear glaze spraying shower, so that the product obtains higher flatness during the firing process. At the same time, the printing powder used by the present invention is a combination of feldspar powder, limestone powder, and quartz powder, so that the dry granular frits have better fluidity when melting at a high temperature, and the flatness of the glaze surface is improved. The higher the flatness of the glaze is, the lower the loss of the module in the polishing process is, the service life of the module is prolonged, and the production cost is saved.

The invention can obtain the effective thickness of the glaze surface to be 0.35-0.45 mm while ensuring the flatness. The wear resistance of the glaze surface of a light color layout can reach level 4, and the wear resistance of a dark color layout can reach level 3.

The following other examples are given to illustrate the present invention in detail. It should also be understood that the following examples are only used to further illustrate the present invention, and cannot be construed as limiting the scope of protection of the present invention. Some non-essential improvements and adjustments made by those skilled in the art based on the above content of the present invention belong to the scope of the present invention's protection. The specific process parameters in the following examples are only an example of the appropriate range, that is, those skilled in the art can make selections within the appropriate range through the description herein, and are not limited to the specific values in the following examples.

EXAMPLE 1

1. Pressing bricks by press machine.
2. Drying in a drying kiln for 1 hour, and controlling the moisture content of the dried blank within 0.5%.
3. Spraying a surface glaze, the temperature of a green brick before spraying the surface glaze is 68° C.; the specific gravity of the surface glaze is 1.46, and the glazing amount is 500 g/m$^2$.
4. Inkjet printing of patterns.
5. Spraying the dry granular glaze on a bell jar, and the temperature of a green brick before spraying the surface glaze is 65° C. The content of each component of the dry granular glaze is shown in Table 3.

TABLE 3

The components of dry granular glaze, the proportional relation involved is a mass proportional relation.

| | material | | | | | |
|---|---|---|---|---|---|---|
| | Dry granule A | Dry granule B | Dry granule C | Printing powder | glue | water |
| proportion (wt %) | 15 | 14 | 15 | 7 | 36 | 13 |

The chemical composition of dry granule A is: $SiO_2$: 63.37%, $Al_2O_3$: 13.57%, CaO: 10.21%, MgO: 1.33%, $K_2O$: 5.04%, $Na_2O$: 0.0%, ZnO: 6.13%, and $ZrO_2$: 0.35%, the softening temperature of dry granule frit A is 1135° C.-1175° C., and the expansion coefficient is $7.3379 \times 10^{-6}$/° C.

The chemical composition of dry granule B is: $SiO_2$: 59.78%, $Al_2O_3$: 12.48%, CaO: 11.74%, MgO: 1.07%, $K_2O$: 6.21%, $Na_2O$: 1.96%, ZnO: 6.47%, and $ZrO_2$: 0.29%, the softening temperature of dry granule B is 980° C.~1050° C., and the expansion coefficient is $6.6630 \times 10^{-6}$/° C.

The chemical composition of dry granule C is: $SiO_2$: 61.34%, $Al_2O_3$: 11.49%, CaO: 10.51%, MgO: 1.75%, $K_2O$: 5.64%, $Na_2O$: 2.15%, ZnO: 6.83%, and $ZrO_2$: 0.29%, the softening temperature of dry granule C is 1020° C.~1127° C., and the expansion coefficient is $6.9141 \times 10^{-6}$/° C.

The printing powder is prepared by mixing 45% feldspar powder, 17% limestone powder, and 38% quartz powder.

The glue is prepared by mixing glaze glue (purchased from Idaga Precision Ceramic Technology Co., Ltd.) and carboxymethyl cellulose (purchased from Rongsheng Chemical Co., Ltd.) with a viscosity of 950 mPa·s according to the mass ratio of 100:0.8.

The chemical composition of the dry granular glaze frits is: loss on ignition: 1.50%, $SiO_2$: 63.84%, $Al_2O_3$: 13.73%, $Fe_2O_3$: 0.05%, $TiO_2$: 0.09%, CaO: 10.84%, MgO: 1.20%, $K_2O$: 6.75%, $Na_2O$: 0.02%, ZnO: 1.97%, and $ZrO_2$: 0.01%.

The particle gradation of the dry granular glaze is: 60 to 80 mesh: 10%, 80 to 100 mesh: 8%, 100 to 120 mesh: 11%, 120 to 140 mesh: 9%, 140 to 250 mesh: 60%, 250 to 325 mesh: 1%, and below 325 mesh: 1%.

The specific gravity of the dry granular glaze is 1.53, the flow rate is 33 seconds, and the glaze application amount is 1050 g/m².

6. Drying in an electric kiln at 145° C. before kiln, controlling the temperature of the drying kiln, and controlling the moisture content after drying within 1.0%.

7. The roller kiln is quickly fired at a low temperature, the firing cycle is 102 minutes, and the highest firing temperature is: 1176° C.

8. Polishing. The polishing line parameters are shown in Table 2.

The prepared ceramic tiles can obtain the glaze surface with the effective thickness of 0.42 mm while ensuring the flatness. According to the industry standard for the wear resistance test of glazed tiles, the sample is cut into 12 cm×12 cm, and is put on the glazed wear resistance tester. On the tester, the cover is fixed on the sample, the steel balls of different diameters are weighted according to the proportion and put into the cover, and then 3 g of diamond-jade powder and 20 ml of water are placed. The abrasion resistance is tested by an abrasion resistance method, so that the abrasion resistance of the glaze surface can reach level 4 for light-colored panels and level 3 for dark-colored panels.

EXAMPLE 2

The components of dry granular glaze A, dry granular glaze B, dry granular glaze C, printing powder and glue used, and process parameters other than the following are the same as those in Example 1. Different from Example 1, the proportion of dry granular glaze is as follows:

TABLE 4

| | material | | | | | |
|---|---|---|---|---|---|---|
| | Dry granule A | Dry granule B | Dry granule C | Printing powder | glue | water |
| proportion (wt %) | 15 | 13 | 16 | 6 | 37 | 13 |

The chemical composition of the dry granular glaze frits is: loss on ignition: 1.52%, $SiO_2$: 63.30%, $Al_2O_3$: 13.53%, Fe2O3: 0.15%, $TiO_2$: 0.05%, CaO: 10.94%, MgO: 1.80%, $K_2O$: 6.75%, $Na_2O$: 0.02%, ZnO: 1.93%, and $ZrO_2$: 0.01%.

The particle gradation of the dry granular glaze is: 60 to 80 mesh: 11%, 80 to 100 mesh: 8%, 100 to 120 mesh: 10%, 120 to 140 mesh: 9%, 140 to 250 mesh: 60%, 250 to 325 mesh: 1%, and below 325 mesh: 1%.

The specific gravity of the dry granular glaze is 1.54, the flow rate is 35 seconds, and the glaze application amount is 900 g/m².

The roller kiln is quickly fired at a low temperature, the firing cycle is 96 minutes, the highest firing temperature is: 1193° C.

Polishing. The polishing line parameters are shown in Table 2.

The prepared ceramic tiles can obtain the glaze surface with the effective thickness of 0.37 mm while ensuring the flatness. The abrasion resistance of the glaze surface can reach level 4 for light-colored panels and level 3 for dark-colored panels.

EXAMPLE 3

The components of dry granular glaze A, dry granular glaze B, dry granular glaze C, printing powder and glue used, and process parameters other than the following are the same as those in Example 1. Different from Example 1, the proportion of dry granular glaze is as follows:

TABLE 5

| | material | | | | | |
|---|---|---|---|---|---|---|
| | Dry granule A | Dry granule B | Dry granule C | Printing powder | glue | water |
| proportion (wt %) | 15 | 13 | 15 | 7 | 38 | 12 |

The chemical composition of dry granular glaze frits is: loss on ignition: 1.45%, $SiO_2$: 63.08%, $Al_2O_3$: 13.93%, $Fe_2O_3$: 0.13%, $TiO_2$: 0.05%, CaO: 11.00%, MgO: 1.60%, $K_2O$: 6.72%, $Na_2O$: 0.02%, ZnO: 2.01%, and $ZrO_2$: 0.01%.

The particle gradation of the dry granular glaze is: 60 to 80 mesh: 12%, 80 to 100 mesh: 9%, 100 to 120 mesh: 14%, 120 to 140 mesh: 8%, 140 to 250 mesh: 55%, 250 to 325 mesh: 1%, and below 325 mesh: 1%.

The specific gravity of the dry granular glaze is 1.52, the flow rate is 35 seconds, and the glaze application amount is 1200 g/m².

The roller kiln is quickly fired at a low temperature, the firing cycle is 98 minutes, and the highest firing temperature is: 1186° C.

Polishing. The polishing line parameters are shown in Table 2.

The prepared ceramic tiles can obtain the glaze surface with the effective thickness of 0.44 mm while ensuring the flatness. The abrasion resistance of the glaze surface can reach level 4 for light-colored panels and level 3 for dark-colored panels.

The invention claimed is:
1. A method for preparing dry granular ceramic tile by a wet slurry spraying process, comprising:
   applying surface glaze and an ink-jet printing pattern on a green body, then bell-shaped spraying dry granular glaze, and sintering to obtain ceramic tiles,
   wherein the dry granular glaze contains: by mass percentage, dry granular frit A: 15%, dry granular frit B: 12% to 15%, dry granular frit C: 13% to 17%, printing powder: 5% to 7%, glue: 35% to 38%, and water 10% to 13%,
   wherein the printing powder is composed of 45% to 50% feldspar powder, 15% to 17% limestone powder, and 35% to 40% quartz powder,
   wherein the particle gradation of the dry granular frits in the dry granular glaze is as follows: 60 to 80 mesh: 8% to 12%, 80 to 100 mesh: 6% to 10%, 100 to 120 mesh: 8% to 15%, 120 to 140 mesh: 8% to 15%, 140 to 250 mesh: 50% to 60%, 250 to 325 mesh: 1% to 4%, and below 325 mesh: ≤2%, and wherein the softening temperature of the dry granular frit A is 1135° C. to 1175° C., the softening temperature of the dry granular frit B is 980° C. to 1050° C., and the softening temperature of the dry granular frit C is 1020° C. to 1127° C.

2. The method of claim 1, wherein the expansion coefficient of the dry granular frit A is $7.3 \times 10^{-6}$ to $7.4 \times 10^{-6}/°$ C. at the temperature of 40° C. to 600° C., and the expansion coefficient of the dry granular frit B is $6.6 \times 10^{-6}$ to $6.7 \times 10^{-6}/°$ C. at the temperature of 40° C. to 600° C., and the expansion coefficient of the dry granular frits C is $6.9 \times 10^{-6}$ to $7.0 \times 10^{-6}/°$ C. at the temperature of 40° C. to 600° C.

3. The method of claim 1, wherein the chemical composition of the dry granular frits is: loss on ignition by mass percentage: 0.50% to 2.00%, $SiO_2$: 60.50% to 65.00%, $Al_2O_3$: 12.00% to 14.00%, $Fe_2O_3$: 0.05% to 0.20%, $TiO_2$: 0.05% to 0.10%, CaO: 9.00% to 11.00%, MgO: 1.00% to 2.00%, $K_2O$: 4.00% to 8.00%, $Na_2O$: 0.00% to 0.05%, ZnO: 1.87% to 2.32%, and $ZrO_2$: 0.01% to 0.03%.

4. The method of claim 1, wherein the dry granular glaze has a specific gravity of 1.52 to 1.54, has a flow rate of 32 to 35 seconds, and is applied at an amount of 900 to 1200 g/m².

5. The method of claim 1, wherein the temperature of the green body before applying the surface glaze is 65° C. to 70° C., the specific gravity of the surface glaze is 1.46 to 1.47, and the glazing amount of the surface glaze is 500 to 550 g/m².

6. The method of claim 1, wherein the temperature of the green body before spraying the dry granular glaze is 60° C. to 70° C.

7. The method according to claim 1, wherein the firing sintering period is 95 to 110 minutes, and a maximum sintering temperature range is 1135°° C. to 1223° C.

8. A ceramic tile prepared by the preparation method described according to claim 1.

* * * * *